Oct. 19, 1937.   G. S. ISKYAN   2,096,328
POCKET TIRE GAUGE
Filed June 9, 1936
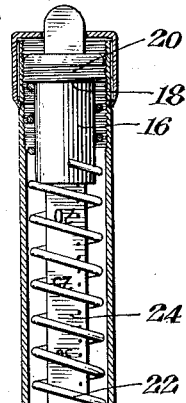
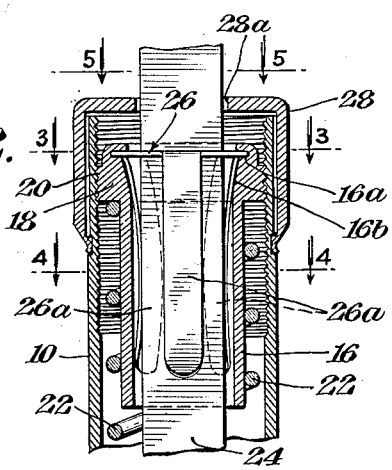
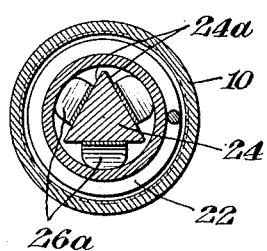
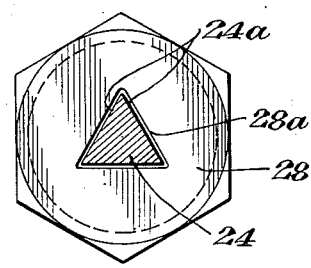
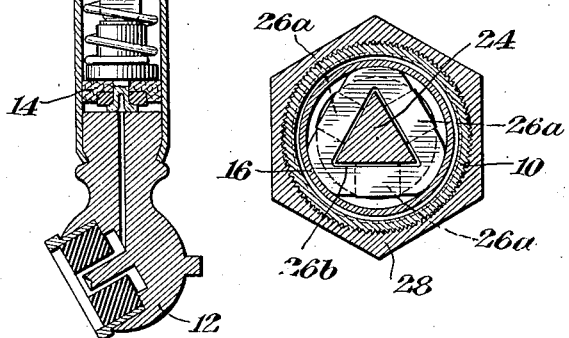
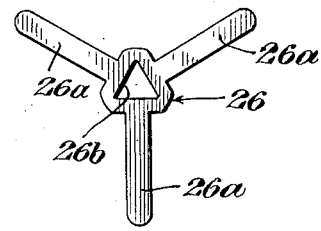
INVENTOR
George S. Iskyan
BY
Prindle, Bean & Mann
ATTORNEYS Patented Oct. 19, 1937

2,096,328

UNITED STATES PATENT OFFICE 2,096,328

POCKET TIRE GAUGE

George S. Iskyan, Elmhurst, N. Y.

Application June 9, 1936, Serial No. 84,268

4 Claims. (Cl. 73—111)

My present invention relates to pocket gauges for use in ascertaining the air pressure in pneumatic tires and other articles. It improves such gauges by making it easier to calibrate them at the factory and to maintain the adjustment in the finished gauge. It also provides improved leaf-spring means for yieldingly engaging the indicator rod of the gauge, which solves the problem of operatively supporting the small leaf-spring element and at the same time enables it to be made out of springy metal suited to the purpose.

These and other objects of the invention will appear from the following description in connection with the drawing, disclosing a preferred illustrative embodiment of pocket gauge within the invention.

In the drawing:

Fig. 1 is a longitudinal section partly in elevation of said gauge;

Fig. 2 is the upper end of Fig. 1 enlarged and further showing the sleeve in longitudinal section, and disclosing the leaf-spring member within it;

Figs. 3 and 4 are cross-sectional views respectively on the lines 3—3 and 4—4 in Fig. 2 looking downwardly;

Fig. 5 is a cross-sectional view on the line 5—5 in Fig. 2 looking downwardly on the cap; and Fig. 6 is a plan view of the leaf-spring element on an enlarged scale before its prongs have been bent up for use.

Referring to the drawing, the illustrative gauge comprises a tubular barrel 10 equipped at one end with an apertured head 12 which may possess any desirable external and internal shape and construction for engaging a valve stem and unseating the valve in said stem and operatively connecting the barrel of the gauge and the air pressure indicating mechanism therein with the air pressure in the tire or other article on which the valve stem is mounted.

Within the barrel of the gauge is the usual piston 14. A sleeve 16 is located in the barrel at the mouth-end thereof, namely the opposite end thereof from the head 12. This sleeve has an outwardly directed flange 18 whose periphery is formed with screw threads 20 which engage corresponding screw threads on the inside of the barrel. A spiral spring 22 is located under compression between the piston 14 and the aforesaid flange 18 of the sleeve. A calibrated indicator rod 24 at one end loosely rests on the piston, and extends through the spiral spring and sleeve and projects at its other end from the mouth of the barrel. The illustrative indicator rod has a triangular cross section 24a.

An apertured disc or washer 26 is secured to the flanged end of the sleeve and has integral prongs 26a bent to extend into the sleeve and bear against the sides of the indicator rod. This washer element is made of a hard springy metal so that its prongs constitute leaf springs to bear yieldingly against the side of the indicator rod. In the illustrative device, the aforesaid washer 26 is stationarily secured to the flanged end of the sleeve 16 by being seated in a recess 16a formed in said sleeve-end, the wall of said recess being then peened over into fixed engagement with the rim portion of the washer. The aperture 26b of the washer is triangular in shape so as to permit the indicator rod to slide freely through it but not to rotate.

A cap 28 is provided for closing the mouth of the barrel. This cap is formed with a triangular aperture 28a through which the indicator rod can freely slide but not rotate. The cap in the finished gauge is crimped or is otherwise securable non-rotatably to the mouth-end of the barrel and thereby maintains whatever adjustment has been given the spiral spring 22 during the calibration of the gauge at the factory. To effect this factory adjustment of the spiral spring, the parts of the gauge are assembled as shown in Fig. 1, except that the cap 28 is not applied. The sleeve 16 is screwed into the right position in the barrel to give the right degree of compression to the spiral spring so that the indicator rod gives correct readings for various air pressures applied to the piston through the head of the gauge. Then without disturbing said rotary adjustment of the sleeve, the cap 28 is applied to the mouth-end of the barrel with the indicator rod projecting through the triangular aperture of the cap. The rim of the cap is then crimped against the barrel so as to be non-rotatably fixed thereon. This maintains the adjustment of the sleeve and therefore of the spring because the triangularly apertured sleeve and cap are threaded by the triangularly cross sectioned indicator rod so that all three of these parts are mechanically tied together (without interfering with the free longitudinal movement of the rod) but none of said parts can rotate independently of the others. The result is that the cap being anchored against rotation in the finished gauge, this serves to anchor the indicator rod and the sleeve against rotation whereby the factory adjustment of the spring is maintained.

It will be understood that the apertures and the cross section of the indicator rod do not have to be triangular but may have any other shape or configuration to accomplish the purpose.

The pronged washer is a very effective way of forming and securing the leaf-spring or springs in operative position. Also it enables metal of suitable springiness to be chosen independently of the kind of metal used in the sleeve. The number of prongs will vary with the shape of the cross section of the indicator rod. In the illustrative device three are used spaced to bear against the three faces of the rod and thereby keep it centered in the sleeve with the corners of the rod out of contact with either the wall of the sleeve or the corners of the rim of the aperture in the washer. The three leaf-springs thus floatingly support the rod for free longitudinal movement smoothly responsive to the outward movement of the piston due to the applied air pressure; and of course said springs yieldingly retain the given position of the indicator rod so that its graduations can be read after the gauge has been disconnected from the tire valve.

The mouth 16b of the sleeve may gradually enlarge or expand outwardly as in Fig. 2 to permit the prongs 26a to pass easily into the main part of the sleeve into yielding face contact with the sides of the indicator rod.

While one illustrative embodiment has been described in detail, it is not my intention to limit the scope of the invention to that particular embodiment or otherwise than by the terms of the appended claims.

What I claim is:

1. In a pocket tire gauge the combination of a tubular barrel equipped at one end with an apertured head for engagement with a tire valve stem, a piston in said barrel toward said head-end thereof, a sleeve in the other end of the barrel, a spiral spring located in the barrel under compression between said piston and sleeve, an indicator rod located within said spiral spring and within said sleeve and resting at one end on the piston and having its other end projecting slidably from the end of the barrel, the sleeve having a screw threaded connection with the inside of the barrel permitting endwise adjustment of the sleeve to adjust the compression of the spiral spring, the sleeve having an internal recess, a disk secured stationarily in said recess, said disk having a non-circular hole through it which is slidably but not rotatably fitted by the indicator rod which also has a non-circular cross section.

2. In a pocket tire gauge the combination of a tubular barrel equipped at one end with an apertured head for engagement with a tire valve stem, a piston in said barrel toward said head-end thereof, a sleeve in the other end of the barrel, a spiral spring located in the barrel under compression between said piston and sleeve, an indicator rod located within said spiral spring and within said sleeve and resting at one end on the piston and having its other end projecting slidably from the end of the barrel, the sleeve having a screw threaded connection with the inside of the barrel permitting endwise adjustment of the sleeve to adjust the compression of the spiral spring, a disk secured to the end of said sleeve and having resilient prongs extending into contact with the sides of the indicator rod, said disk having a hole therein through which the rod slidably projects.

3. In a pocket tire gauge the combination of a tubular barrel equipped at one end with an apertured head for engagement with a tire valve stem, a piston in said barrel toward said head-end thereof, a sleeve in the other end of the barrel, a spiral spring located in the barrel under compression between said piston and sleeve, an indicator rod located within said spiral spring and within said sleeve and resting at one end on the piston and having its other end projecting slidably from the end of the barrel, the sleeve having a screw threaded connection with the inside of the barrel permitting endwise adjustment of the sleeve to adjust the compression of the spiral spring, a disk secured to the end of said sleeve and having resilient prongs extending into the bore of the sleeve adjacent the wall thereof into contact with the sides of the indicator rod, said disk having a hole therein through which the rod slidably but non-rotatably projects.

4. In a pocket tire gauge the combination of a tubular barrel equipped at one end with an apertured head for engagement with a tire valve stem, a piston in said barrel toward said head-end thereof, a sleeve in the other end of the barrel, a spiral spring located in the barrel under compression between said piston and sleeve, an indicator rod located within said spiral spring and within said sleeve and resting at one end on the piston and having its other end projecting slidably from the end of the barrel, the sleeve having a screw threaded connection with the inside of the barrel permitting endwise adjustment of the sleeve to adjust the compression of the spiral spring, said sleeve having an internal recess, a disc secured in said recess, said disc having resilient prongs extending into contact with the sides of the indicator rod, said disc having a hole therein through which the rod projects.

GEORGE S. ISKYAN.